United States Patent
Torita et al.

(10) Patent No.: US 10,971,712 B2
(45) Date of Patent: Apr. 6, 2021

(54) SEPARATOR INCLUDING THERMOPLASTIC RESIN AND METAL HYDROXIDE PARTICLES, NON-AQUEOUS ELECTROLYTE SECONDARY BATTERY, AND METHOD OF MANUFACTURING SEPARATOR

(71) Applicant: TOYOTA JIDOSHA KABUSHIKI KAISHA, Toyota (JP)

(72) Inventors: Koji Torita, Nagoya (JP); Harunari Shimamura, Toyonaka (JP); Yusuke Fukumoto, Toyonaka (JP); Akihiro Ochiai, Toyonaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 16/135,148

(22) Filed: Sep. 19, 2018

(65) Prior Publication Data
US 2019/0115581 A1    Apr. 18, 2019

(30) Foreign Application Priority Data

Oct. 18, 2017  (JP) .............................. JP2017-201664

(51) Int. Cl.
| | |
|---|---|
| *H01M 2/16* | (2006.01) |
| *H01M 10/42* | (2006.01) |
| *H01M 2/14* | (2006.01) |
| *H01M 10/0585* | (2010.01) |
| *H01M 10/0525* | (2010.01) |
| *H01M 10/054* | (2010.01) |

(52) U.S. Cl.
CPC ......... *H01M 2/1686* (2013.01); *H01M 2/145* (2013.01); *H01M 2/166* (2013.01); *H01M 2/1646* (2013.01); *H01M 2/1653* (2013.01); *H01M 10/4235* (2013.01); *H01M 2/162* (2013.01); *H01M 10/054* (2013.01); *H01M 10/0525* (2013.01); *H01M 10/0585* (2013.01)

(58) Field of Classification Search
CPC .. H01M 2/145; H01M 2/1646; H01M 2/1653; H01M 2/166; H01M 2/1686
USPC ....................................................... 429/249
See application file for complete search history.

(56) References Cited

U.S. PATENT DOCUMENTS

| | | | | |
|---|---|---|---|---|
| 4,224,393 | A * | 9/1980 | Feinberg | H01M 2/1653 429/251 |
| 4,287,276 | A * | 9/1981 | Lundquist, Jr. | C08K 3/22 429/206 |
| 4,327,164 | A * | 4/1982 | Feinberg | H01M 2/1653 429/144 |
| 2002/0148723 | A1* | 10/2002 | Takata | B01D 67/0027 204/252 |
| 2010/0173187 | A1* | 7/2010 | Nishikawa | H01M 2/1686 429/129 |

(Continued)

FOREIGN PATENT DOCUMENTS

| | | | | |
|---|---|---|---|---|
| CN | 105185936 A | 12/2015 | | |
| EP | 1416552 A2 * | 5/2004 | ......... | H01M 2/1653 |

(Continued)

*Primary Examiner* — Sean P Cullen
(74) *Attorney, Agent, or Firm* — Sughrue Mion, PLLC

(57) ABSTRACT

A separator is for a non-aqueous electrolyte secondary battery. The separator includes at least a porous film. The porous film contains a resin composition. The resin composition contains a thermoplastic resin and metal hydroxide particles.

11 Claims, 6 Drawing Sheets

(56) References Cited

U.S. PATENT DOCUMENTS

2015/0249242 A1 9/2015 Kamo et al.
2016/0254511 A1* 9/2016 Hatta ..................... H01M 4/13
                                                        307/10.1
2017/0133683 A1* 5/2017 Takebayashi ....... H01M 10/052

FOREIGN PATENT DOCUMENTS

| JP | 11-191417 A | 7/1999 | | |
|---|---|---|---|---|
| JP | 2002-201298 A | 7/2002 | | |
| JP | 2010-212046 A | 9/2010 | | |
| JP | 2015-180716 A | 10/2015 | | |
| WO | WO-2015068325 A1 * | 5/2015 | ............ | H01M 2/166 |

* cited by examiner

SEPARATOR INCLUDING THERMOPLASTIC RESIN AND METAL HYDROXIDE PARTICLES, NON-AQUEOUS ELECTROLYTE SECONDARY BATTERY, AND METHOD OF MANUFACTURING SEPARATOR

This nonprovisional application is based on Japanese Patent Application No. 2017-201664 filed with the Japan Patent Office on Oct. 18, 2017, the entire contents of which are hereby incorporated by reference.

BACKGROUND

Field

The present disclosure relates to a separator, a non-aqueous electrolyte secondary battery, and a method of manufacturing a separator.

Description of the Background Art

Japanese Patent Laying-Open No, 11-191417 discloses addition of metal hydroxide particles to an electrode in a non-aqueous electrolyte secondary battery (which can herein be abbreviated as a "battery").

SUMMARY

Thermal decomposition of metal hydroxide particles brings about a heat absorption and dehydration reaction. As a result of addition of the metal hydroxide particles to the electrode, in heat generation of the battery, an endothermic effect resulting from the heat absorption and dehydration reaction of the metal hydroxide particles and a cooling effect resulting from deserted water are expected. Namely, suppression of heat generation on the occurrence of an abnormality is expected.

Metal hydroxide particles, however, are not involved in a charging and discharging reaction of the battery. Therefore, when the metal hydroxide particles are added to the electrode, increase in resistance during normal use can be accelerated.

An object of the present disclosure is to provide a separator capable of suppressing heat generation on the occurrence of an abnormality while increase in resistance during normal use is suppressed.

Technical features and functions and effects of the present disclosure will be described below. A functional mechanism of the present disclosure, however, includes presumption. The scope of claims should not be limited by whether or not the functional mechanism is correct.

[1] A separator in the present disclosure is for a non-aqueous electrolyte secondary battery. The separator includes at least a porous film. The porous film contains a resin composition. The resin composition contains a thermoplastic resin and metal hydroxide particles.

When the separator contains metal hydroxide particles, suppression of heat generation on the occurrence of an abnormality is expected. This is because of a heat absorption and dehydration reaction of the metal hydroxide particles at the time when the battery generates heat. Since the metal hydroxide particles are not arranged in an electrode, increase in resistance during normal use can be suppressed. Therefore, it is considered that, according to the separator in the present disclosure, heat generation on the occurrence of an abnormality can be suppressed while increase in resistance during normal use is suppressed.

[2] The metal hydroxide particles may be at least one type selected from the group consisting of aluminum hydroxide particles, nickel hydroxide particles, magnesium hydroxide particles, and zinc hydroxide particles.

These metal hydroxide particles are expected to reveal a heat absorption and dehydration reaction when the battery generates heat.

[3] A content of the metal hydroxide particles may be not smaller than 1 part by volume and not greater than 60 parts by volume with respect to 100 parts by volume of the thermoplastic resin.

With 1 part by volume or more of the content of the metal hydroxide particles, enhancement of an effect of suppression of heat generation is expected. With 60 parts by volume or less of the content of the metal hydroxide particles, promotion of shut-down is expected. Shut-down refers to such a phenomenon that pores are closed as a result of melting of a thermoplastic resin. Promotion of shut-down is expected to lead to an enhanced effect of suppression of heat generation.

[4] The thermoplastic resin may be polyethylene.

Polyethylene (PE) can have a relatively low melting point. With PE being adopted as the thermoplastic resin, the metal hydroxide particles can be exposed through the separator in an early stage of heat generation by the battery. Therefore, efficient cooling of the electrode or the like is expected.

[5] A non-aqueous electrolyte secondary battery in the present disclosure includes at least the separator according to any one of [1] to [4].

Suppression of heat generation on the occurrence of an abnormality while increase in resistance during normal use is suppressed is expected in the non-aqueous electrolyte secondary battery in the present disclosure.

[6] A method of manufacturing a separator in the present disclosure is a method of manufacturing a separator for a non-aqueous electrolyte secondary battery. The method of manufacturing a separator in the present disclosure includes at least (a) to (d) below:

(a) Preparing a melt by melting a thermoplastic resin;
(b) Preparing a resin composition by mixing the melt and metal hydroxide particles;
(c) Forming the resin composition into a film; and
(d) Manufacturing a separator including at least a porous film by providing a plurality of pores in the film.

According to the method of manufacturing a separator in the present disclosure, the separator described in any one of [1] to [4] can be manufactured.

In a method of containing metal hydroxide particles in a porous film, for example, cavities in the porous film may be filled with the metal hydroxide particles or the metal hydroxide particles may be applied to a surface of the porous film. With such a method, however, with filling with or application of the metal hydroxide particles, a porosity and an air resistance of the porous film lower. In addition, in order to fix the metal hydroxide particles, a binder may be required. The porosity could also lower due to the binder. The porosity may also be adjusted based on an amount of filling with or an amount of application of the metal hydroxide particles with the porosity being maintained high. In this case, however, a stable porous structure may not be formed.

According to the method of manufacturing a separator in the present disclosure, a resin composition in which metal hydroxide particles are dispersed is prepared. The resin composition is processed into a film. The film is made porous. Therefore, it is considered that a porous film containing metal hydroxide particles with its porosity being controlled within a desired range can be formed.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure (which is herein denoted as the "present embodiment") will be described below. The description below, however, does not limit the scope of claims.

<Separator>

A separator in the present embodiment is for a non-aqueous electrolyte secondary battery. A lithium ion secondary battery and a sodium ion secondary battery represent examples of the non-aqueous electrolyte secondary battery.

Figure 1:
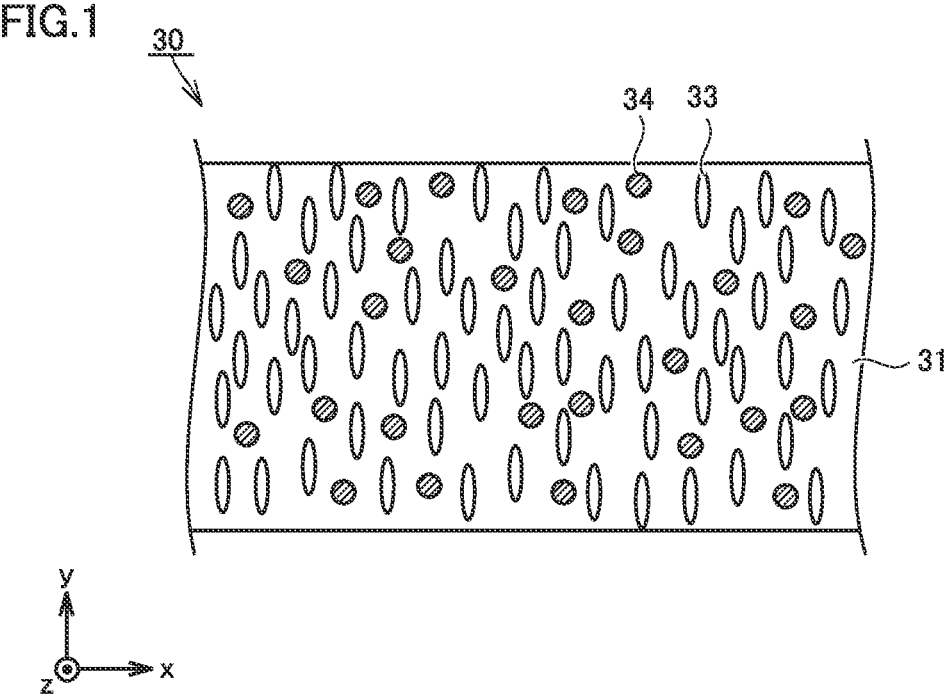
FIG. 1 is a conceptual cross-sectional view showing a first example of a construction of a separator in the present embodiment.

FIG. 1 is a conceptual cross-sectional view showing a first example of a construction of the separator in the present embodiment.

A separator 30 may have a single-layered structure. Separator 30 includes at least a first porous film 31. First porous film 31 contains a resin composition. First porous film 31 may be formed substantially only of the resin composition.

Separator 30 may have a thickness, for example, not smaller than 9 μm and not greater than 30 μm. A thickness of separator 30 can be measured, for example, with a micrometer. A thickness of separator 30 may be measured in a cross-sectional micrograph. The microscope may be an electron microscope. The microscope may be an optical microscope. A thickness of separator 30 is measured at at least three locations. An arithmetic mean of thicknesses at at least three locations is adopted as a thickness of separator 30. Separator 30 may have a thickness, for example, not smaller than 12 μm. Separator 30 may have a thickness, for example, not greater than 24 μm.

A plurality of pores 33 are provided in first porous film 31. Separator 30 may have an air resistance, for example, not shorter than 100 seconds and not longer than 400 seconds. An "air resistance" is measured with a method in conformity with "JIS P8117: Paper and Board-Determination of Air Permeance and Air Resistance (Medium Range)—Gurley Method." An air resistance is measured at least three times. An arithmetic mean resulting from measurement at least three times is adopted as an air resistance of separator 30. When the air resistance is excessively low, self-discharging can tend to occur. When the air resistance is excessively high, a resistance of the battery can be high.

Separator 30 may have a porosity, for example, not lower than 30% and not higher than 60%. A "porosity" is measured with a mercury intrusion technique. The porosity is measured at least three times. An arithmetic mean resulting from measurement at least three times is adopted as a porosity of separator 30. When the porosity is excessively low, a resistance of the battery can be high. When the porosity is excessively high, self-discharging can tend to occur.

<<Resin Composition>>

A skeleton (a portion other than cavities) of first porous film 31 is formed of a resin composition. The resin composition contains a thermoplastic resin and metal hydroxide particles 34.

<<Hydroxide Particles>>

Pores 33 are not filled with metal hydroxide particles 34. Metal hydroxide particles 34 are contained in the resin composition which forms the skeleton of first porous film 31. Metal hydroxide particles 34 are substantially uniformly dispersed in the resin composition. Suppression of heat generation is expected as a result of a heat absorption and dehydration reaction of metal hydroxide particles 34 at the time when the battery generates heat.

Metal hydroxide particles 34 may have an average particle size, for example, not smaller than 0.1 μm and not greater than 10 μm. An "average particle size" is measured with a laser diffraction/scattering method. The average particle size refers to a particle size at which a cumulative volume of particles from a finer side attains to 50% of the total volume of particles in a volume-based particle size distribution.

<<Content of Metal Hydroxide Particles>>

A content of metal hydroxide particles 34 may be, for example, not smaller than 0.5 part by volume with respect to 100 parts by volume of the thermoplastic resin. A volume of each material is calculated based on a mass of each material. A volume of each material is calculated by dividing a mass of each material by a true specific gravity (a true density) of each material. The volume of metal hydroxide particles 34 is converted to a value with a volume of the thermoplastic resin being defined as 100. A part by volume of metal hydroxide particles 34 with respect to 100 parts by volume of thermoplastic resin is thus calculated.

A content of metal hydroxide particles 34 may be, for example, not smaller than 1 part by volume and not greater than 60 parts by volume with respect to 100 parts by volume of the thermoplastic resin. Enhancement of the effect of suppression of heat generation is expected owing to the content of metal hydroxide particles 34 being not smaller than 1 part by volume. Promotion of shut-down is expected owing to the content of metal hydroxide particles 34 being not greater than 60 parts by volume. A content of metal hydroxide particles 34 may be, for example, not smaller than 5 parts by volume. A content of metal hydroxide particles 34 may be, for example, not greater than 30 parts by volume. A content of metal hydroxide particles 34 may be, for example, not greater than 10 parts by volume. Improved balance between the effect of suppression of heat generation and the effect of promotion of shut-down is expected within these ranges.

<<Type of Metal Hydroxide Particles>>

Examples of metal hydroxide particles 34 include aluminum hydroxide particles, nickel hydroxide particles, magnesium hydroxide particles, and zinc hydroxide particles.

The heat absorption and dehydration reaction of these metal hydroxide particles 34 in heat generation by the battery is expected. One type of metal hydroxide particles 34 alone may be used. Two or more types of metal hydroxide particles 34 as being combined may be used. Namely, metal hydroxide particles 34 may be at least one selected from the group consisting of aluminum hydroxide particles, nickel hydroxide particles, magnesium hydroxide particles, and zinc hydroxide particles.

Metal hydroxide particles 34 may be zinc hydroxide particles. The zinc hydroxide particles can be lower in thermal decomposition temperature than other metal hydroxide particles 34. A thermal decomposition temperature of zinc hydroxide particles is approximately 125° C. For example, a thermal decomposition temperature of aluminum hydroxide particles is approximately from 200 to 300° C. It is expected that, with zinc hydroxide particles being adopted as metal hydroxide particles 34, the endothermic effect is obtained in an early stage of heat generation by the battery.

<<Thermoplastic Resin>>

The thermoplastic resin desirably has a melting point lower than the thermal decomposition temperature of metal hydroxide particles 34. The thermoplastic resin may be polyolefin such as polyethylene (PE) or polypropylene (PP).

The thermoplastic resin may be PE. PE can have a relatively low melting point. With PE being adopted as the thermoplastic resin, in heat generation by the battery, metal hydroxide particles 34 can be exposed through separator 30 (a first porous film 31) in an early stage. Therefore, efficient cooling of the electrode or the like is expected. PE may have a melting point, for example, not lower than 132° C. and not higher than 142° C.

From a point of view of a temperature of the battery during normal use, PE having a melting point not lower than 110° C. may be used. From a point of view of the effect of suppression of heat generation on the occurrence of an abnormality, PE having a melting point not higher than 130° C. may be used. Namely PE may have a melting point not lower than 110° C. and not higher than 130° C.

A melting point of the thermoplastic resin can be adjusted, for example, based on a density or a molecular weight of the thermoplastic resin. A melting point of the thermoplastic resin is measured with differential scanning calorimetry (DSC). The inciting point refers to a peak top temperature of a melting peak in a inching curve of DSC. A rate of temperature increase is set to approximately 5° C./minute. A melting point is measured at least three times. An arithmetic mean resulting from measurement at least three times is adopted as a melting point of the thermoplastic resin.

<<Other Components>>

The resin composition may contain substantially only the thermoplastic resin and metal hydroxide particles 34. The resin composition may further contain other components within a range in which the endothermic effect of metal hydroxide particles 34 is not lost. Examples of other components include an oxidation inhibitor, an ultraviolet absorbing agent, a charge control agent, and an antiblocking agent.

<<Multi-Layered Structure>>

Figure 2:
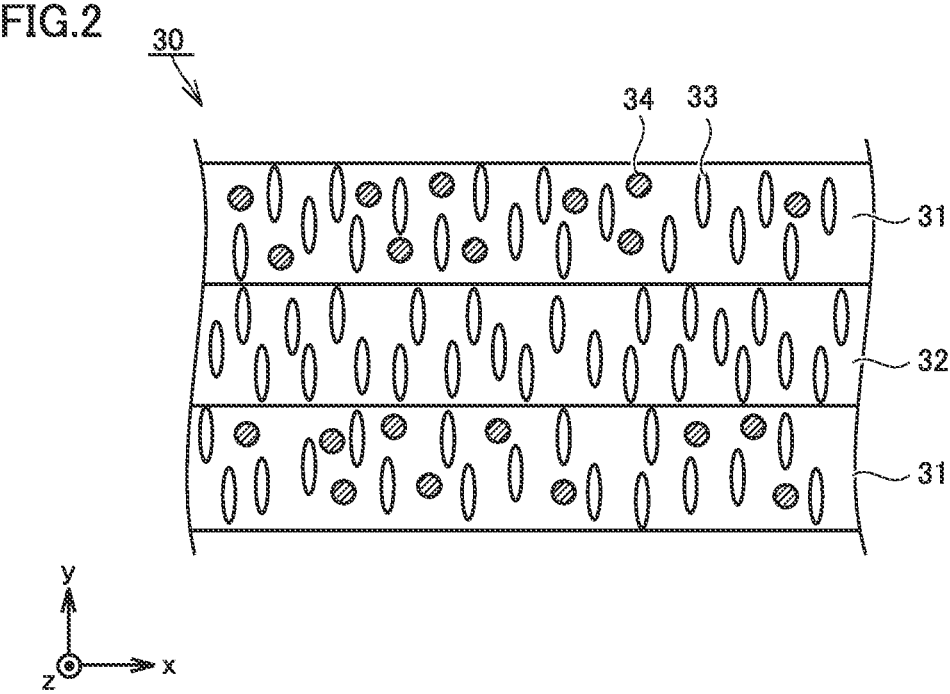
FIG. 2 is a conceptual cross-sectional view showing a second example of the construction of the separator in the present embodiment.

FIG. 2 is a conceptual cross-sectional view showing a second example of the construction of the separator in the present embodiment.

Separator 30 may have a multi-layered structure. Separator 30 includes first porous film 31 and a second porous film 32. First porous film 31 contains metal hydroxide particles 34. Details of first porous film 31 are as described previously. Second porous film 32 does not contain metal hydroxide particles 34. Second porous film 32 may be formed substantially only of the thermoplastic resin. The thermoplastic resin which forms second porous film 32 may be, for example, polyolefin such as PE or PP.

The multi-layered structure may be, for example, a three-layered structure. Separator 30 may be formed, for example, by stacking first porous film 31 (a first layer), second porous film 32 (a second layer), and first porous film 31 (first layer) in this order. It is also considered that the effect of cooling of the electrode is enhanced with exposure of first porous film 31 containing metal hydroxide particles 34 at the surface of separator 30.

Figure 3:
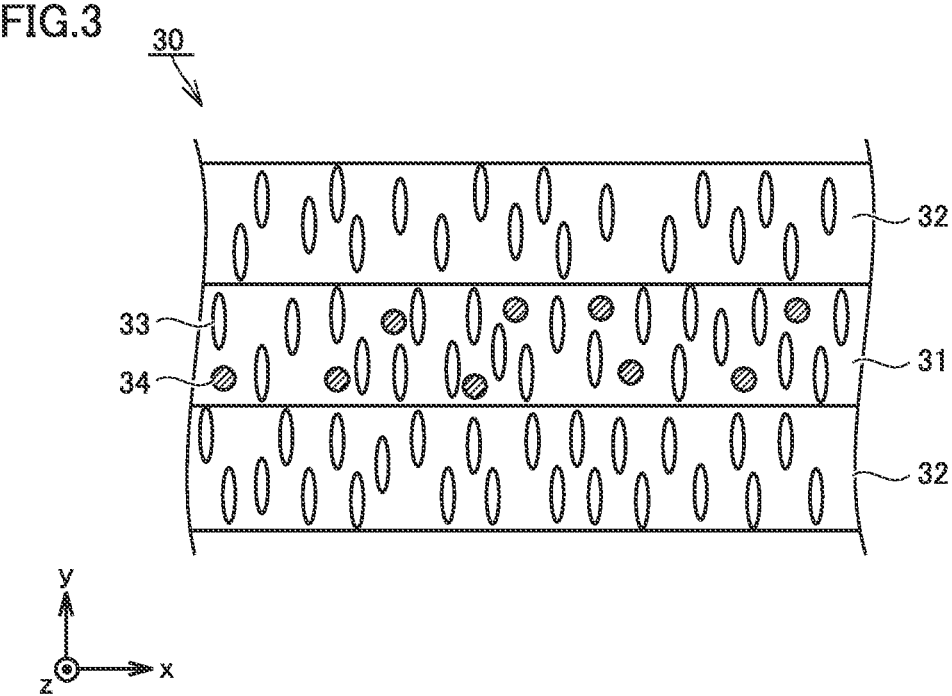
FIG. 3 is a conceptual cross-sectional view showing a third example of the construction of the separator in the present embodiment.

FIG. 3 is a conceptual cross-sectional view showing a third example of the construction of the separator in the present embodiment.

Separator 30 may be formed, for example, by stacking second porous film 32 (second layer), first porous film 31 (first layer), and second porous film 32 (second layer) in this order. It is also considered that increase in resistance is suppressed as a result of absence of direct contact of first porous film 31 containing metal hydroxide particles 34 with the electrode.

When separator 30 has the three-layered structure as well, separator 30 can have a thickness, for example, not smaller than 9 μm and not greater than 30 μm. When separator 30 has the three-layered structure, first porous film 31 (first layer) and second porous film 32 (second layer) may each have a thickness, for example, not smaller than 3 μm and not greater than 10 μm. First porous film 31 (first layer) and second porous film 32 (second layer) may each have a thickness, for example, not smaller than 6 μm and not greater than 7 μm.

<<Heat-Resistant Layer>>

A heat-resistant layer (not shown) may be formed on an outermost surface of separator 30. The heat-resistant layer may have a thickness, for example, not smaller than 3 μm and not greater than 10 μm. The heat-resistant layer may have a thickness, for example, not smaller than 4 μm and not greater than 6 μm. The heat-resistant layer contains, for example, a heat-resistant material and a binder. The heat-resistant layer may contain, for example, at least 2 mass % and at most 30 mass % of binder and a heat-resistant material as the remainder. The heat-resistant layer may contain, for example, at least 2 mass and at most 4 mass % of binder and a heat-resistant material as the remainder.

The heat-resistant material should not particularly be limited. The heat-resistant material may be, for example, metal oxide particles. The metal oxide particles may be, for example, α alumina particles, boehmite (alumina monohydrate) particles, titania particles, or magnesia particles. One type of metal oxide particles alone may be used. Two or more types of metal oxide particles as being combined may be used.

The binder should not particularly be limited. The binder may be, for example, an acrylic binder, polyvinylidene difluoride (PVDF), a polyvinylidene difluoride-hexafluoropropylene copolymer (PVDF-HFP), aramid, carboxymethyl cellulose (CMC), styrene-butadiene rubber (SBR), polytetrafluoroethylene (PTFE), and polyimide. One type of binder alone may be used. Two or more types of binders as being combined may be used.

<Method of Manufacturing Separator>

Figure 4:
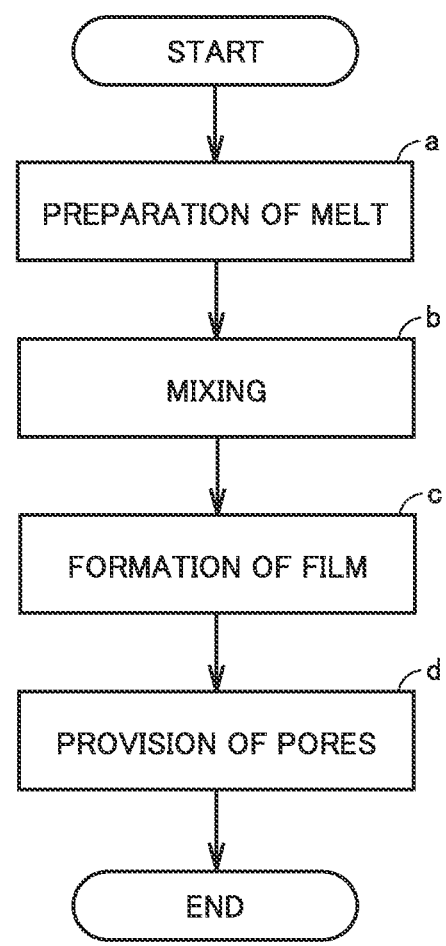
FIG. 4 is a flowchart showing overview of a method of manufacturing a separator in the present embodiment.

FIG. 4 is a flowchart showing overview of a method of manufacturing a separator in the present embodiment.

The method of manufacturing a separator in the present embodiment is a method of manufacturing a separator for a non-aqueous electrolyte secondary battery. The method of manufacturing a separator in the present embodiment includes at least "(a) preparation of melt," "(b) mixing", "(c) formation of film," and "(d) provision of pores."

<<(a) Preparation of Melt>>

The method of manufacturing a, separator in the present embodiment includes preparing a melt by melting a thermoplastic resin.

Details of the thermoplastic resin are as described previously. For example, a melt is prepared by heating a thermoplastic resin at a temperature higher than the melting point of the thermoplastic resin. For example, the thermoplastic resin may be heated in a heat mixer. The heat mixer should not particularly be limited so long as it has a heating function. The heat mixer may be, for example, a uniaxial extruder, a biaxial extruder, a Henschel Mixer®, or a kneader.

<<(b) Mixing>>

The method of manufacturing a separator in the present embodiment includes preparing a resin composition by mixing the melt and metal hydroxide particles 34.

Details of metal hydroxide particles 34 are as described previously. For example, the melt and metal hydroxide particles 34 are mixed in a heat mixer. A resin composition is thus prepared. A temperature for mixing is set to a temperature lower than a thermal decomposition temperature of metal hydroxide particles 34. The temperature for mixing may be set, for example, to a temperature lower by approximately at least 10° C. and at most 20° C. than the melting point of the thermoplastic resin. Other conditions for mixing (a time period for mixing and the number of rotations of a screw and an agitation blade) can be adjusted as appropriate so as to uniformly disperse metal hydroxide particles 34.

<<(c) Formation of Film>>

The method of manufacturing a separator in the present embodiment includes forming the resin composition into a film. A process thereafter should not particularly be limited. The resin composition can be processed into a porous film with a conventionally known method. A process thereafter may be what is called a wet method. A process thereafter may be what is called a dry method.

A film with a single-layered structure may be formed, for example, through extrusion (T-die extrusion or inflation). A film with a multi-layered structure (for example, a three-layered structure) may be formed, for example, through coextrusion (T-die extrusion). In the wet method, a plasticizer can be mixed with the resin composition, for example, in a uniaxial extruder or a biaxial extruder.

<<(d) Provision of Pores>>

The method of manufacturing a separator in the present embodiment includes manufacturing separator 30 including at least first porous film 31 by providing a plurality of pores 33 in the film.

Pores 33 can be provided in the film, for example, with a stretching method. Separator 30 including first porous film 31 can thus be manufactured. When the film has a multi-layered structure, separator 30 including first porous film 31 and second porous film 32 can be manufactured.

Stretching may be performed concurrently with heating. Stretching may be uniaxial stretching. Stretching may be biaxial stretching. Biaxial stretching may be successive stretching. Biaxial stretching may be simultaneous biaxial stretching. In the wet method, after stretching, a plasticizer can be removed, for example, by extracting a solvent or drying by heating. Conditions for stretching (for example, a draw ratio or a temperature) can be adjusted as appropriate so as to achieve a desired porosity and air resistance. Pores 33 may be provided in the film by etching and foaming in addition to the stretching method.

After first porous film 31 is formed, first porous film 31 may be cut into a prescribed width dimension. A heat-resistant layer may be formed on an outermost surface of separator 30. Heat treatment for stabilizing the porous structure may further be performed. Separator 30 in the present embodiment can be manufactured as set forth above.

<Non-Aqueous Electrolyte Secondary Battery>

Figure 5:
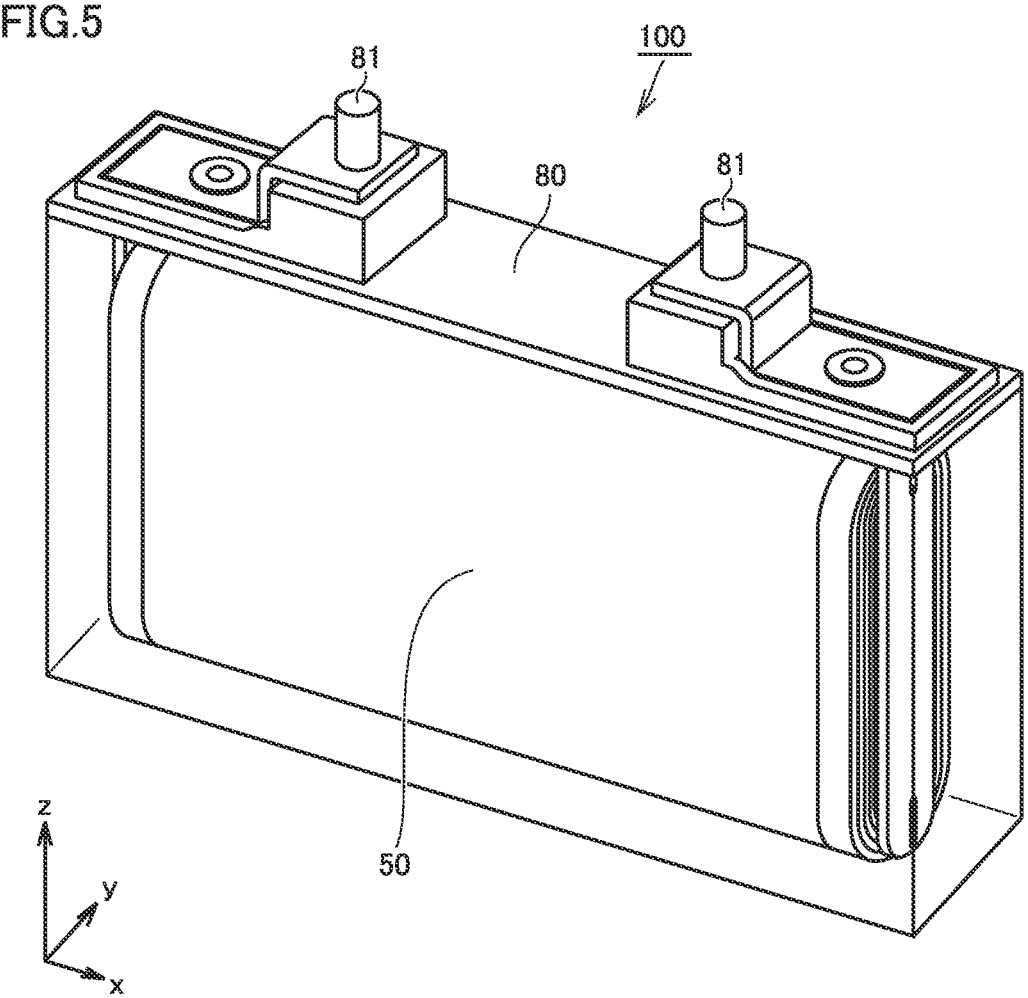
FIG. 5 is a schematic diagram showing one example of a construction of a non-aqueous electrolyte secondary battery in the present embodiment.

FIG. 5 is a schematic diagram showing one example of a construction of a non-aqueous electrolyte secondary battery in the present embodiment.

A battery 100 includes a case 80. Case 80 is hermetically sealed. Case 80 may be made, for example, of an aluminum (Al) alloy. Case 80 is in a prismatic shape (a parallelepiped of a flat profile). A shape of case 80, however, should not be limited. Case 80 may be cylindrical. Case 80 may be a pouch made of an Al laminated film. Namely, battery 100 may be a laminate-type battery.

Case 80 includes a terminal 81. Case 80 may be provided with a current interrupt device (CID), a gas exhaust valve, and a liquid introduction port. Case 80 accommodates an electrode group 50 and an electrolyte. Electrode group 50 is electrically connected to terminal 81.

Figure 6:
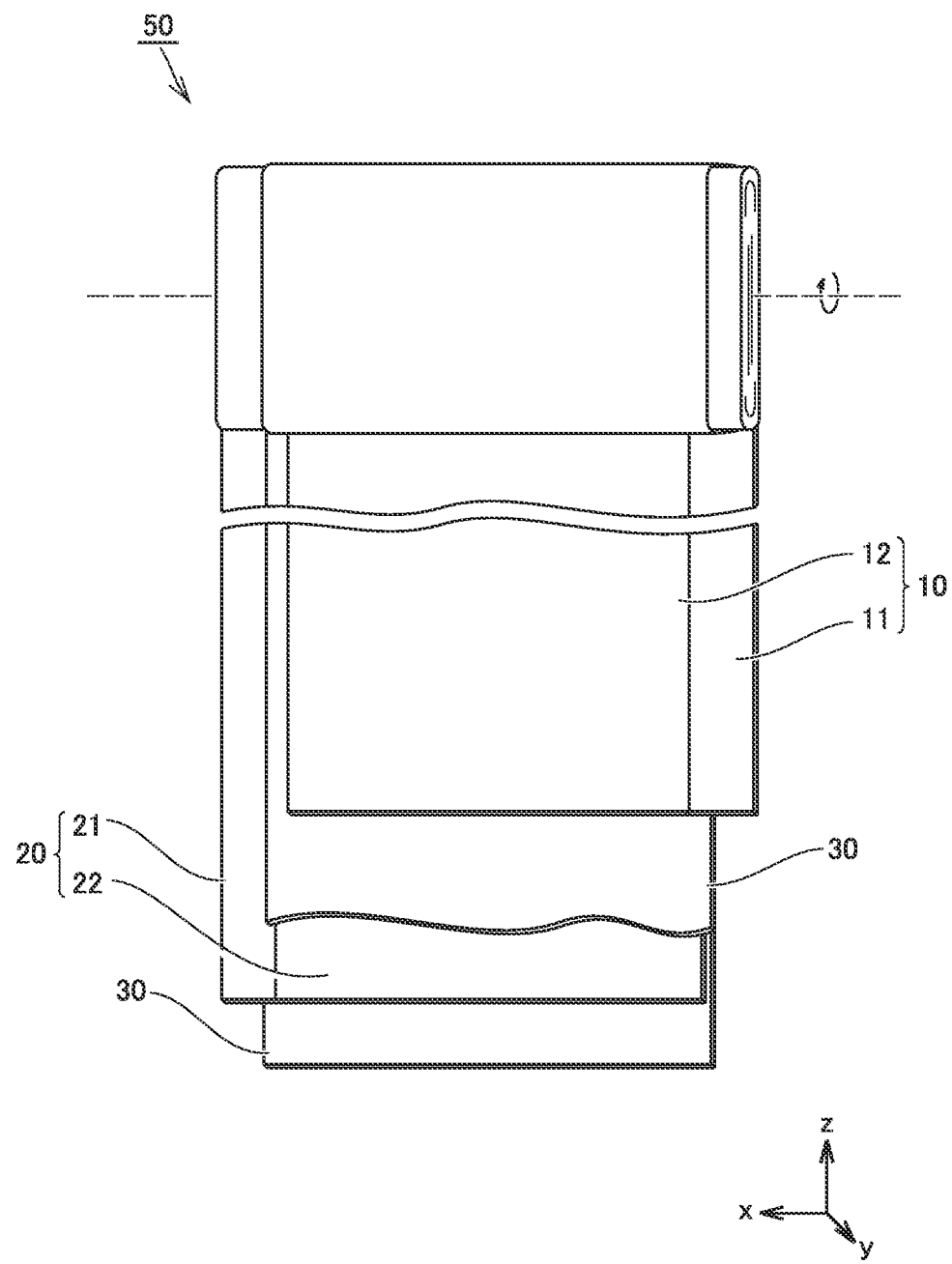
FIG. 6 is a schematic diagram showing one example of a construction of an electrode group in the present embodiment.

FIG. 6 is a schematic diagram showing one example of a construction of the electrode group in the present embodiment.

Electrode group 50 is of a wound type. Electrode group 50 is formed by stacking a positive electrode 10, separator 30, a negative electrode 20, and separator 30 in this order and further spirally winding the same.

Namely, battery 100 includes at least separator 30 in the present embodiment. Details of separator 30 in the present embodiment are as described previously. In battery 100, suppression of heat generation on the occurrence of an abnormality while increase in resistance during normal use is suppressed is expected. This is because separator 30 contains metal hydroxide particles 34.

Electrode group 50 may be formed in a flat profile. Electrode group 50 may be of a stack (layered) type. Electrode group 50 of the stack type can be formed by alternately stacking positive electrode 10 and negative electrode 20. Separator 30 is arranged between positive electrode 10 and negative electrode 20. Features other than separator 30 will be described below.

<<Positive Electrode>>

Positive electrode 10 is in a form of a sheet. Positive electrode 10 may include a positive electrode current collector 11 and a positive electrode composite material layer 12, Positive electrode current collector 11 may have a thickness, for example, not smaller than 5 µm and not greater than 25 µm. Positive electrode current collector 11 may be, for example, an Al foil. Positive electrode composite material layer 12 is formed on a surface of positive electrode current collector 11. Positive electrode composite material layer 12 may be formed on both of front and rear surfaces of positive electrode current collector 11. Positive electrode composite material layer 12 may have a thickness, for example, not smaller than 100 µm and not greater than 200 µm. Positive electrode composite material layer 12 may contain at least a positive electrode active material. Positive electrode composite material layer 12 may contain, for example, at least 87 mass % and at most 98.7 mass % of a positive electrode active material, at least 0.8 mass % and at most 8 mass % of a conductive material, and a binder as the remainder.

The positive electrode active material may have an average particle size, for example, not smaller than 1 µm and not greater than 30 µm. The positive electrode active material should not particularly be limited. The positive electrode active material may be, for example, $LiCoO_2$, $LiNiO_2$, $LiMnO_2$, $LiNi_xCo_yM_{(1-y-x)}O_2$ (M representing Mn or Al, and x and y satisfying a condition of $0.35 \leq x \leq 0.88$, $0 < y \leq 0.65$, and $x+y<1$) [for example, $LiNi_{0.82}Co_{0.15}Al_{0.03}O_2$, $LiNi_{0.88}Co_{0.06}Mn_{0.06}O_2$, $LiNi_{0.35}Co_{0.35}Mn_{0.30}O_2$, $LiNi_{0.4}CO_{0.2}Mn_{0.2}O_2$, and $LiNi_{0.6}Co_{0.3}Mn_{0.1}O_2$], $LiMn_2O_4$, or $LiFePO_4$. One type of positive electrode active material may be used alone. Two or more types of positive electrode active materials may be used as being combined. The conductive material should not particularly be limited. The conductive material may be, for example, acetylene black (AB). The binder should not particularly be limited. The binder may be, for example, PVDF or PVDF-HFP.

<<Negative Electrode>>

Negative electrode 20 is in a form of a sheet. Negative electrode 20 may include a negative electrode current collector 21 and a negative electrode composite material layer 22. Negative electrode current collector 21 may have a thickness, for example, not smaller than 5 µm and not greater than 15 µm. Negative electrode current collector 21 may be, for example, a copper (Cu) foil. Negative electrode composite material layer 22 is formed on a surface of negative electrode current collector 21. Negative electrode composite material layer 22 may be formed on both of front and rear surfaces of negative electrode current collector 21. Negative electrode composite material layer 22 may have a thickness, for example, not smaller than 50 µm and not greater than 150 µm. Negative electrode composite material layer 22 contains at least a negative electrode active material. Namely, battery 200 contains at least a negative electrode material. Negative electrode composite material layer 22 may contain, for example, at least 94 mass % and at most 99.2 mass % of a negative electrode active material and a binder as the remainder.

The negative electrode active material may have an average particle size, for example, not smaller than 1 µm and not greater than 30 µm. The negative electrode active material should not particularly be limited. The negative electrode active material may be graphite, soft carbon, hard carbon, silicon, silicon oxide, a silicon-based alloy, tin, tin oxide, or a tin-based alloy. One type of negative electrode active material alone may be used. Two or more types of negative electrode active materials as being combined may be used.

For example, graphite and low-crystalline carbon (soft carbon) may be used as being combined. For example, a surface of graphite may be coated with low-crystalline carbon. For example, graphite and an alloy-based negative electrode active material (silicon oxide) may be used as being combined. A ratio of mixing may be set, for example, to "graphite:alloy-based negative electrode active material=70:30 to 100:0 (at a mass ratio)." A ratio of a capacity of the negative electrode per unit area to a capacity of the positive electrode per unit area may be, for example, not lower than 1.7 and not higher than 2.0. The binder should not particularly be limited. The binder may be, for example, CMC and SBR.

<<Electrolyte>>

The electrolyte may be any of a liquid electrolyte, a gel electrolyte, and a solid electrolyte. The liquid electrolyte may be, for example, an electrolyte solution or an ionic liquid. An electrolyte solution is described herein by way of example of the electrolyte.

An electrolyte solution contains a solvent and supporting salt. The supporting salt is dissolved in the solvent. The electrolyte solution may contain, for example, at least 0.5 mol/l and at most 2 mol/l of supporting salt. The supporting salt may be, for example, $LiPF_6$, $LiPF_4$, $Li[N(FSO_2)_2]$, or $Li[N(CF_3SO_2)_2]$. One type of supporting salt may be used alone. Two or more types of supporting salt may be used as being combined.

The solvent may contain, for example, cyclic carbonate and chain carbonate. A ratio of mixing of cyclic carbonate and chain carbonate may be set, for example, to "cyclic carbonate:chain carbonate=1:9 to 5:5 (at a volume ratio)." Cyclic carbonate may be, for example, ethylene carbonate (EC), propylene carbonate (PC), butylene carbonate (BC), or fluoroethylene carbonate (FEC). One type of cyclic carbonate may be used alone. Two or more types of cyclic carbonate may be used as being combined.

Chain carbonate may be, for example, dimethyl carbonate (DMC), ethyl methyl carbonate (EMC), or diethyl carbonate (DEC). One type of chain carbonate may be used alone. Two or more types of chain carbonate may be used as being combined.

The solvent may include, for example, lactone, cyclic ether, chain ether, and carboxylate. Lactone may be, for example, γ-butyrolactone (GBL) or δ-valerolactone. Cyclic ether may be, for example, tetrahydrofuran (THF), 1,3-dioxolane, or 1,4-dioxane. Chain ether may be 1,2-dimethoxyethane (DME). Carboxylate may be, for example, methyl formate (MF), methyl acetate (MA), or methyl propionate (MP).

The electrolyte solution may further contain various functional additives in addition to the solvent and the supporting salt. The electrolyte solution may contain, for example, at least 0.005 mol/l and at most 0.5 mol/l of functional additive. Examples of the functional additive include a gas generating agent (what is called an overcharge additive) and a solid electrolyte interface (SEI) film forming agent.

The gas generating agent may be, for example, cyclohexylbenzene (CHB) or biphenyl (BP). The SEI film forming agent may be, for example, vinylene carbonate (VC), vinyl ethylene carbonate (VEC)), $LiB(C_2O_4)_2$, $LiBF_2(C_2O_4)$, $LiBF_2(C_2O_4)_2$, $LiPO_2F_2$, propane sultone (PS), or ethylene sulfite (ES). One type of functional additive alone may be used. Two or more types of functional additives as being combined may be used.

EXAMPLES

Examples of the present disclosure will be described below. The description below does not limit the scope of claims.

<Manufacturing of Separator>

Example 1

<<(a) Preparation of Melt>>

PP (a thermoplastic resin having a melting point of 165° C.) was prepared. PP was molten in a heat mixer. A melt was thus prepared.

<<(b) Mixing>>

Aluminum hydroxide particles (metal hydroxide particles 34) were introduced into the heat mixer. The melt and the aluminum hydroxide particles were mixed. A resin composition was thus prepared. A content of aluminum hydroxide particles was set to 5 parts by volume with respect to 100 parts by volume of PP.

<<(c) Formation of Film>>

Through coextrusion with the use of a T-die, a three-layered film was formed.

<<(d) Provision of Pores>>

A plurality of pores were provided in the film through biaxial stretching. Separator 30 including at least first porous film 31 was thus manufactured. Separator 30 had a thickness of 19 μm. Separator 30 had a three-layered structure. Separator 30 was formed by stacking first porous film 31 (first layer), second porous film 32 (second layer), and first porous film 31 (first layer) in this order (see FIG. 2).

First porous film 31 (first layer) had a thickness of 6 μm. First porous film 31 (first layer) was formed of a resin composition (PP and aluminum hydroxide particles) prepared as above.

Second porous film 32 (second layer) had a thickness of 7 μm. Second porous film 32 (second layer) contained no metal hydroxide particles 34. Second porous film 32 (second layer) was formed only of PE.

Separator 30 was cut into a prescribed width. Separator 30 according to Example 1 was manufactured as set forth above.

Examples 2 and 3

Separator 30 was manufactured as in Example 1 except for change in type of metal hydroxide particles 34 as shown in Table 1 below.

Comparative Examples 1 and 2

Separator 30 was manufactured as in Example 1 except for not using metal hydroxide particles 34 as shown in Table 1 below.

Examples 4 and 5

PE (having a melting point of 142° C.) was used as the thermoplastic resin as shown in Table 1 below. Separator 30 with a single-layered structure was manufactured through single-layer extrusion with the use of a T-die. Separator 30 had a thickness of 19 μm. Separator 30 was formed only of first porous film 31 (see FIG. 1). Aluminum hydroxide particles (Example 4) and nickel hydroxide particles (Example 5) were used as metal hydroxide particles 34.

Examples 6 and 7

Separator 30 was manufactured as in Examples 4 and 5 except for use of PE having a melting point in Table 1 below.

Example 8

Separator 30 was manufactured through coextrusion with the use of a T-die. As shown in Table 1 below, separator 30 was formed by stacking second porous film 32 (second layer), first porous film 31 (first layer), and second porous film 32 (second layer) in this order (see FIG. 3). Separator 30 had a thickness of 19 μm. First porous film 31 (first layer) had a thickness of 7 μm. Second porous film 32 (second layer) had a thickness of 6 μm.

Example 9

Separator 30 was manufactured as in Example 8 except for use of PE having a melting point in Table 1 below.

Example 10

Separator 30 was manufactured as in Example 9 except for use of zinc hydroxide particles as metal hydroxide particles 34.

Examples 11 to 15

Separator 30 was manufactured as in Example 10 except for change in amount of mixing of metal hydroxide particles 34 for setting a content in Table 1 below.

<Evaluation>

<<Manufacturing of Non-Aqueous Electrolyte Secondary Battery>>

Battery 100 (a lithium ion secondary battery in a prismatic shape) including features below was manufactured. Battery 100 included separator 30 manufactured as above.

Positive electrode 10 (see FIG. 6)

Positive electrode current collector 11: Al foil (a thickness of 15 μm)

Composition of positive electrode composite material layer 12: "positive electrode active material:AB:PVDF=93:4:3 (at a mass ratio)"

Thickness of positive electrode composite material layer 12: 150 μm

As shown in Table 1 below, aluminum hydroxide particles were added to positive electrode composite material layer 12 in Comparative Example 2. No metal hydroxide particle was added to positive electrode composite material layer 12 in other Examples and Comparative Examples.

Negative electrode 20 (see FIG. 6)

Negative electrode current collector 21: Cu foil (a thickness of 10 μm)

Composition of negative electrode composite material layer 22: "negative electrode active material:CMC:SBR=98:1:1 (at a mass ratio)"

Thickness of negative electrode composite material layer 22: 80 μm

Electrode group 50 (see FIGS. 5 and 6)

Type: wound type

Width dimension (a dimension in a direction of the x axis in FIG. 5): 130 mm Height dimension (a dimension in a direction of the z axis in FIG. 5): 50 mm Winding tension: not lower than 0.35 N/mm$^2$ and not higher than 4.3 N/mm$^2$ ("Winding tension" represents a value obtained by dividing a tension applied to separator 30 during winding by a cross-sectional area of separator 30).

Electrolyte (electrolyte solution)

Solvent; "EC:EMC:DMC=3:3:4 (at a volume ratio)"

Supporting salt: LiPF$_6$ (1.1 mol/l)

<<High-Load Charging and Discharging Test>>

Increase in resistance during normal use was evaluated in a high-load charging and discharging test. The high-load charging and discharging test herein corresponds to an accelerated deterioration test for accelerating increase in resistance.

With a sequence of "charging", "first rest," "discharging", and "second rest" below being defined as one cycle, one thousand cycles were performed. A resistance of the battery was measured after one cycle and one thousand cycles. A rate of increase in resistance was calculated by dividing the resistance of the battery after one thousand cycles by the resistance of the battery after one cycle. Table 1 shows results. It is considered that, when a rate of increase in resistance is approximately as high as in Comparative Example 1, increase in resistance associated with addition of metal hydroxide particles 34 to battery 100 is suppressed.

Charging: current rate=2.5 C, time period=240 seconds
First rest: 120 seconds
Discharging: current rate=30 C, time period=240 seconds
Second rest: 120 seconds "1 C" refers to a rate of a current with which a rated capacity of battery 100 is discharged in one hour, 2.5 C represents a current rate 2.5 times as high as 1 C, and 30 C represents a current rate 30 times as high as 1 C.

<<Test by Nailing>>

Heat generation on the occurrence of an abnormality was evaluated in a test by nailing.

A nail was prepared. The nail had a diameter in a body portion of 3 mm. Battery 100 was charged. Charged battery 100 was heated to 60° C. The nail was driven into charged and heated battery 100. A surface temperature of case 80 was measured at a position distant by 1 cm from a position where the nail was driven. After the nail was driven, a highest value of the surface temperature was defined as a reached temperature. Table 1 shows the reached temperature. It is considered that heat generation on the occurrence of an abnormality was suppressed as the reached temperature was lower.

TABLE 1

List of Examples and Comparative Examples

| | Separator | | | | | | Evaluation | |
|---|---|---|---|---|---|---|---|---|
| | First Porous Film (First Layer) Resin Composition | | | | Second Porous Film | | High-Load Charging and Discharging Test | Test by Nailing |
| | Thermoplastic Resin | | Metal Hydroxide Particles | | (Second Layer) | | Rate of Increase in Resistance [%] | Reached Temperature [° C.] |
| | Type | Melting Point [° C.] | Type | Content [Part by Volume] | Thermoplastic Resin Type | Multi-Layered Structure | | |
| Example 1 | PP | 165 | Aluminum Hydroxide Particles | 5 | PE | First Layer/Second Layer/First Layer | 130 | 350 |
| Example 2 | PP | 165 | Nickel Hydroxide Particles | 5 | PE | First Layer/Second Layer/First Layer | 130 | 300 |
| Example 3 | PP | 165 | Magnesium Hydroxide Particles | 5 | PE | First Layer/Second Layer/First Layer | 130 | 370 |
| Comparative Example 1 | PP | 165 | — | 0 | PE | First Layer/Second Layer/First Layer | 130 | 450 |
| Comparative Example 2 | PP | 165 | — (*) | 0 (*) | PE | First Layer/Second Layer/First Layer | 200 | 440 |
| Example 4 | PE | 142 | Aluminum Hydroxide Particles | 5 | — | First Layer (Single-Layered Structure) | 130 | 330 |
| Example 5 | PE | 142 | Nickel Hydroxide Particles | 5 | — | First Layer (Single-Layered Structure) | 130 | 260 |
| Example 6 | PE | 140 | Aluminum Hydroxide Particles | 5 | — | First Layer (Single-Layered Structure) | 130 | 325 |
| Example 7 | PE | 135 | Nickel Hydroxide Particles | 5 | — | First Layer (Single-Layered Structure) | 130 | 250 |
| Example 8 | PE | 133 | Nickel Hydroxide Particles | 5 | PP | Second Layer/First Layer/Second Layer | 130 | 245 |
| Example 9 | PE | 132 | Nickel Hydroxide Particles | 5 | PP | Second Layer/First Layer/Second Layer | 130 | 244 |
| Example 10 | PE | 132 | Zinc Hydroxide Particles | 5 | PP | Second Layer/First Layer/Second Layer | 130 | 150 |
| Example 11 | PE | 132 | Zinc Hydroxide Particles | 0.5 | PP | Second Layer/First Layer/Second Layer | 130 | 180 |
| Example 12 | PE | 132 | Zinc Hydroxide Particles | 1 | PP | Second Layer/First Layer/Second Layer | 130 | 160 |
| Example 13 | PE | 132 | Zinc Hydroxide Particles | 10 | PP | Second Layer/First Layer/Second Layer | 130 | 145 |
| Example 14 | PE | 132 | Zinc Hydroxide Particles | 30 | PP | Second Layer/First Layer/Second Layer | 130 | 140 |
| Example 15 | PE | 132 | Zinc Hydroxide Particles | 60 | PP | Second Layer/First Layer/Second Layer | 130 | 130 |

(*) In Comparative Example 2, aluminum hydroxide particles were added to the positive electrode composite material layer.

<Results>

In the results in Comparative Example 1 and Examples 1 to 3, a tendency of lowering in reached temperature owing to first porous film 31 containing metal hydroxide particles 34 was found. Examples 1 to 3 were comparable to Comparative Example 1 in rate of increase in resistance. In Comparative Example 2, metal hydroxide particles 34 were added to positive electrode composite material layer 12. In Comparative Example 2, an amount of towering in reached temperature was small. In Comparative Example 2, the rate of increase in resistance significantly increased.

In the results in Examples 1, 2, 4, and 5, the reached temperature lowered when separator 30 had a single-layered structure and a multi-layered structure. The reason why Examples 4 and 5 were lower in reached temperature than Examples 1 and 2 may be because of PE being lower in melting point than PP.

In the results in Examples 4 and 6 and Examples 5, 7, and 8, a tendency of a tower reached temperature with a lower melting point of PE was found. This may be because metal hydroxide particles 34 were exposed in an earlier stage as the melting point of PE was lower.

In the results in Examples 10 to 15, such a tendency that an amount of lowering in reached temperature was large owing to a content of metal hydroxide particles 34 being not smaller than 1 part by volume with respect to 100 parts by volume of thermoplastic resin was found.

A tendency of a large amount of lowering in reached temperature in adoption of zinc hydroxide particles as metal hydroxide particles 34 was found. This may be because of a tow thermal decomposition temperature of the zinc hydroxide particles.

The embodiment and Examples disclosed herein are illustrative and non-restrictive in every respect. The technical scope defined by the terms of the claims includes any modifications within the scope and meaning equivalent to the terms of the claims.

What is claimed is:

1. A separator for a non-aqueous electrolyte secondary battery comprising:
   at least a porous film,
   the porous film containing a resin composition, and
   the resin composition containing a first thermoplastic resin and metal hydroxide particles,
   wherein the metal hydroxide particles are at least one type selected from the group consisting of nickel hydroxide particles and zinc hydroxide particles,
   the first thermoplastic resin is a polyolefin resin, and
   a content of the metal hydroxide particles is not smaller than 1 part by volume and not greater than 60 parts by volume with respect to 100 parts by volume of the thermoplastic resin.

2. The separator according to claim 1, wherein
   the polyolefin resin is polyethylene.

3. The separator according to claim 1, wherein the metal hydroxide particles are zinc hydroxide particles.

4. The separator according to claim 1, wherein the metal hydroxide particles are dispersed in the first thermoplastic resin.

5. The separator according to claim 1, wherein a content of the metal hydroxide particles is not smaller than 1 part by volume and not greater than 30 parts by volume with respect to 100 parts by volume of the thermoplastic resin.

6. The separator according to claim 1, wherein a content of the metal hydroxide particles is not smaller than 1 part by volume and not greater than 10 parts by volume with respect to 100 parts by volume of the thermoplastic resin.

7. The separator according to claim 1, wherein
   the porous film has a three-layered structure,
   the three-layered structure has a first layer, a second layer, and a third layer in order,
   the first layer and the third layer contain the resin composition, and
   the second layer consists essentially of a second thermoplastic resin.

8. The separator according to claim 1, wherein
   the porous film has a three-layered structure,
   the three-layered structure has a first layer, a second layer, and a third layer in order,
   the first layer and the third layer consists essentially of a second thermoplastic resin, and
   the second layer contains the resin composition.

9. A non-aqueous electrolyte secondary battery comprising at least the separator according to claim 1.

10. A method of manufacturing a separator for a non-aqueous electrolyte secondary battery comprising at least:
    preparing a melt by melting a polyolefin resin;
    preparing a resin composition by mixing the melt and metal hydroxide particles, wherein the metal hydroxide particles are at least one type selected from the group consisting of nickel hydroxide particles and zinc hydroxide particles;
    forming the resin composition into a film; and
    manufacturing a separator including at least a porous film by providing a plurality of pores in the film,
    wherein a content of the metal hydroxide particles is not smaller than 1 part by volume and not greater than 60 parts by volume with respect to 100 parts by volume of the polyolefin resin.

11. The method of manufacturing a separator according to claim 10, wherein the metal hydroxide particles are zinc hydroxide particles.

* * * * *